Figure 1:
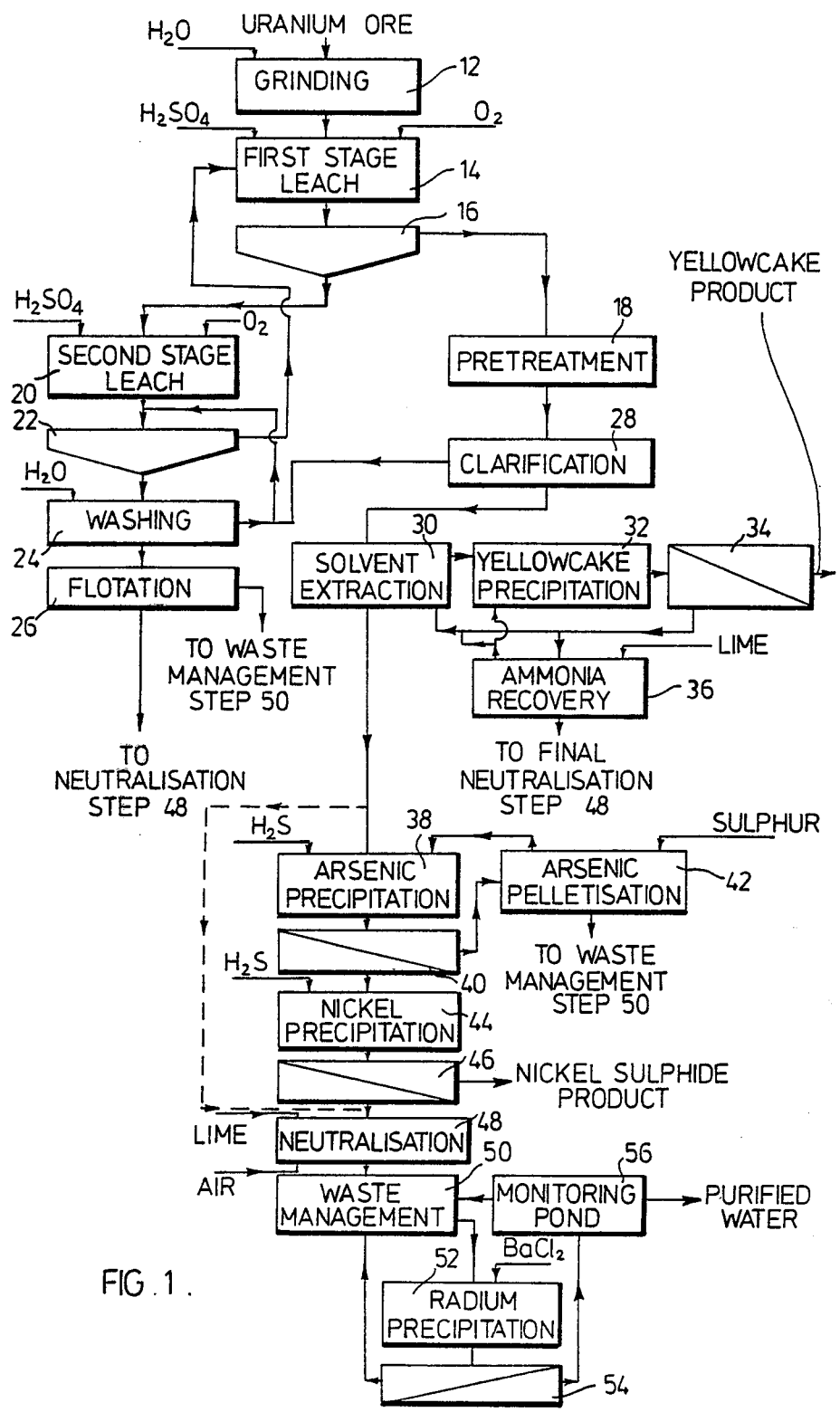

United States Patent [19]

Weir et al.

[11] 4,406,864

[45] Sep. 27, 1983

[54] RECOVERY OF URANIUM FROM MATERIAL CONTAINING IRON, ARSENIC AND SILICEOUS MATTER

[75] Inventors: Donald R. Weir; Ian M. Masters, both of Fort Saskatchewan; Roman M. Genik-Sas-Berezowsky, Edmonton, all of Canada

[73] Assignee: Sherritt Gordon Mines Limited, Toronto, Canada

[21] Appl. No.: 192,767

[22] Filed: Oct. 1, 1980

[30] Foreign Application Priority Data

Aug. 22, 1980 [CA] Canada ............................ 358968

[51] Int. Cl.³ .................. C01G 43/01; C01G 28/00; C01G 53/11
[52] U.S. Cl. ........................................ 423/9; 423/18; 423/20; 423/87; 423/139; 423/140
[58] Field of Search ............... 423/18, 20, 9, 87, 139, 423/140

[56] References Cited

U.S. PATENT DOCUMENTS 3,268,288 8/1966 Goren ..................... 423/18
4,272,490 6/1981 Sefton et al. ............. 423/20

FOREIGN PATENT DOCUMENTS 555622 4/1958 Canada ..................... 423/18

OTHER PUBLICATIONS

Merritt, Robert C. "The Extractive Metallurgy of Uranium", 1971, pp. 59–83, 182–187, 469–472, 477–480.
Bailar, J. C. et al., Eds., "Comprehensive Inorganic Chemistry", vol. 2, Pergamon Press, p. 612.

Primary Examiner—Deborah L. Kyle
Assistant Examiner—Matthew A. Thexton
Attorney, Agent, or Firm—Robert F. Delbridge; Arne I. Fors

[57] ABSTRACT

A process for the recovery of uranium values from uranium-containing material which also contains iron, arsenic and siliceous matter, includes leaching the uranium-containing material in aqueous sulphuric acid solution under conditions to provide dissolved iron present in the resultant leach solution as predominantly ferrous iron rather than ferric iron and/or to provide a sulphuric acid concentration in the leach solution sufficiently high to substantially prevent the precipitation of arsenates. Uranium values are recovered from the leach solution by solvent extraction agent which has little affinity for arsenic.

8 Claims, 3 Drawing Figures

RECOVERY OF URANIUM FROM MATERIAL CONTAINING IRON, ARSENIC AND SILICEOUS MATTER

This invention relates to the recovery of uranium values from material which, in addition to uranium, also contains iron, arsenic, siliceous matter and possible also nickel.

It is known to leach uranium-containing material in sulphuric acid solution, and to subsequently recover uranium values from the leach solution by ion exchange or solvent extraction, with some appropriate pretreatment of the leach solution usually being carried out before uranium recovery. Such uranium-containing material frequently also contains iron and siliceous matter, and it is necessary to control the amount and nature of iron and siliceous matter in the leach solution to obtain satisfactory recovery of uranium values.

However, when the material also contains arsenic, arsenic may also be present in the leach solution, thereby further complicating the recovery of uranium. For example, if uranium values are recovered from the leach solution by a basic solid ion exchange agent, such as a strong or weak base resin, arsenic values as well as uranium values may be extracted from the leach solution by the ion exchange agent. On the other hand, if a basic liquid ion exchange agent of the kind which has little affinity for arsenic is used, such as a secondary or tertiary amine, insoluble arsenates may be formed during the liquid ion exchange, or solvent extraction operation, as it is most commonly referred to, with the result that the arsenate precipitated may cause or contribute to the formation of stable emulsions or cruds and adversely affect solvent extraction efficiency and uranium product purity.

It has been proposed to remove at least some of the arsenic from solution before uranium values are recovered in an attempt to overcome these problems. Typical proposals for such arsenic removal are pH adjustment to precipitate the arsenic as ferric arsenate or treatment with hydrogen sulphide to precipitate the arsenic as a sulphide. However, such proposals have not been found to be particularly satisfactory in practice, since such removal of arsenic almost inevitably removes some of the uranium, which is therefore lost. Further, where pH adjustment is used, the pH adjustment may itself produce uranium losses and may also produce difficulties in the subsequent uranium recovery step. Also, where $H_2S$ is used, some $U^{6+}$ is reduced to $U^{4+}$ and will react with phosphates which are usually present to produce insoluble uranous phosphate, thus resulting in further loss of uranium. Further, since $U^{4+}$ values are not readily extractable by basic solid or liquid ion exchange agents, re-oxidation of the solution before uranium recovery is necessary.

It would therefore be advantageous if the necessity for providing an arsenic removal step before recovery of uranium values from the leach solution could be dispensed with.

It may also be mentioned that where certain ion exchange agents such as anionic resins are used in the uranium recovery step, a preliminary pH adjustment is usually required, with the production of similar problems as with the pH adjustment step for arsenic removal mentioned above.

It is therefore an object of the invention to provide an improved process for the recovery of uranium values from material which, in addition to uranium, also contains iron, siliceous matter and arsenic, such that as little uranium as possible is lost during the various steps of the process and such that the recovered uranium is as little contaminated by arsenic as possible.

According to the invention, such uranium-containing material is leached in aqueous sulphuric acid solution under conditions such that dissolved iron present in the resultant leach solution is predominantly present as ferrous iron rather than ferric iron and/or the sulphuric acid concentration in the leach solution is sufficiently high to substantially prevent the precipitation of arsenates, and uranium values are recovered from the leach solution by solvent extraction with a solvent extraction agent which has little affinity for arsenic.

It has been found that such a process can be satisfactorily carried out without an arsenic removal step being necessary between the leach step and the solvent extraction step.

If a single stage leach is used, the leach conditions can be controlled to provide a sufficiently high sulphuric acid concentration in the leach solution, it being necessary in such a case to ensure that iron present in the ferric form remains soluble, and preferably the ratio of ferric to ferrous ions of at least 3:1 is maintained to ensure that uranium is efficiently leached from the starting material. A single stage leach however has the disadvantage that more acid is required and, after the solvent extraction step, the remaining solution contains a relatively high amount of sulphuric acid as well as arsenic values.

If a two-stage countercurrent leach is used, the leach conditions can be controlled to provide a leach solution in which the iron is predominantly present in ferrous form, for example a ratio of ferrous to ferric iron of at least 10:1 with the result that the sulphuric acid concentration in the leach solution from which uranium is recovered can be lower than in the case where a single stage leach is used.

Consequently, therefore, the leach step is advantageously carried out in two stages, for example with a first leach stage at atmospheric pressure and a second leach stage at atmospheric pressure or at a higher pressure, with the residue from the first leach stage being passed to the second leach stage the leach solution from the second leach stage being recycled to the first leach stage, and the leach solution from the first leach stage being passed to the solvent extraction step. In the second leach stage, dissolved iron is predominantly in ferric form to ensure efficient uranium extraction, and in the first leach stage most of the dissolved ferric iron is reduced to the ferrous form.

It may or may not be necessary also lower the content of colloidal or dissolved silica in an appropriate manner prior to uranium recovery from the leach solution. Thus, before the solvent extraction step, the leach product solution may be treated with an organic polymer to lower the silica content.

In this way therefore, uranium values can be recovered from the leach solution by solvent extraction with a solvent extraction agent which has little affinity for arsenic, such as a basic solvent extraction agent of the tertiary amine kind. In accordance with the invention, conditions are such that no significant amount of insoluble ferric arsenate which would interfere with the solvent extraction is formed, and the recovered uranium is not unduly contaminated with arsenic.

It will therefore be readily observed that the process of the invention satisfactorily overcomes the problems of the prior art described earlier, especially with regard to the fact that an arsenic removal step between the leach step and the solvent extraction step is unnecessary.

After the solvent extraction step, the raffinate may be treated for removal of arsenic. For example, hydrogen sulphide gas may be used to precipitate arsenic as arsenic sulphide. Where a two-stage leach has been used as described above, dissolved iron is predominantly present as ferrous iron rather than ferric iron, and there will be little or no precipitation of iron as ferric arsenate. Thus, in this case, little hydrogen sulphide would be wasted in reducing ferric iron to ferrous iron. The precipitated arsenic sulphide may be agglomerated with sulphur for disposal in an environmentally acceptable manner.

If the uranium containing material also contains nickel, the arsenic removal step mentioned above may be conducted in such a manner that a minimal amount of nickel is co-precipitated with the arsenic. Thus, the barren liquor remaining after the arsenic recovery step may be treated for the recovery of nickel. Again, such treatment may be with hydrogen sulphide so that nickel sulphide is precipitated and subsequently recovered. Since the effectiveness of nickel recovery by hydrogen sulphide precipitation is largely dependent on solution acidity, some pH adjustment may be necessary after the arsenic precipitation step, i.e. prior to or during the nickel precipitation step. Leach solution from a two-stage leach, rather than from a single stage leach, is therefore preferred because its lower acidity means that less pH adjustment reagent is required.

After the nickel recovery step, or directly after the solvent extraction step if the arsenic removal step and nickel recovery step are omitted, the remaining solution may be treated with lime to raise the pH to a value in the range of from about 8 to about 10 and with air to oxidize ferrous iron to ferric iron, to precipitate the remaining nickel values as hydroxides, and to precipitate remaining arsenic values as arsenate. In addition, traces of heavy metals such as cobalt, copper, molybednum and zinc are substantially removed as hydroxides.

Figure 2:
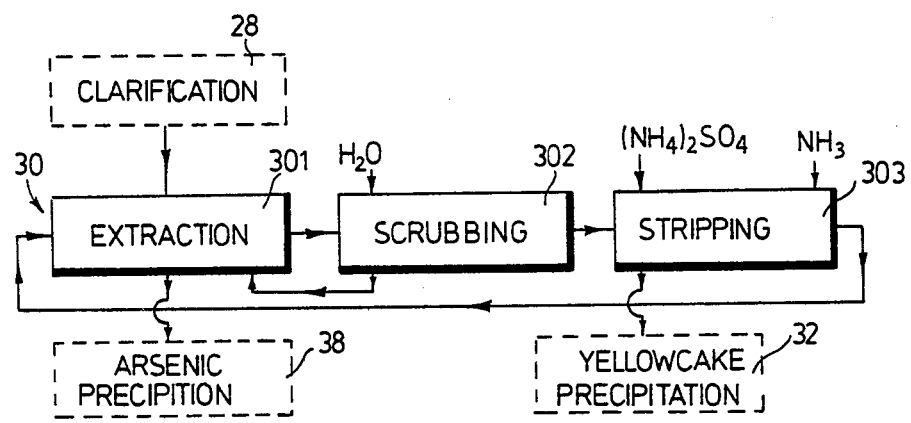
Figure 3:
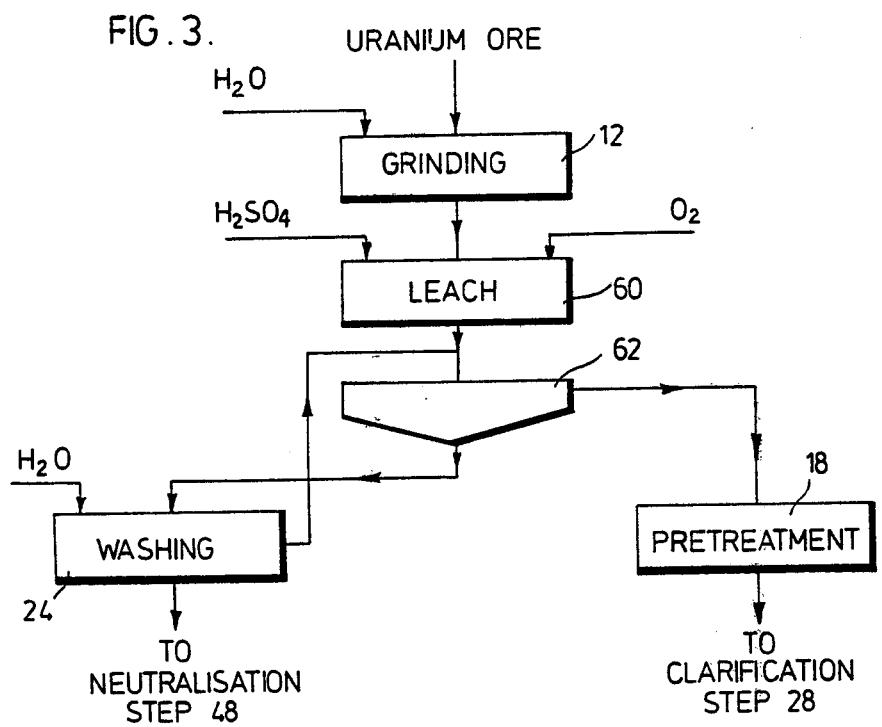

One embodiment of the invention will now be described, by way of example, with reference to the accompanying drawings, of which:

FIG. 1 shows a flow sheet of a uranium-recovery process including a two-stage leach, FIG. 2 is a more detailed view of the solvent extraction step shown in FIG. 1, and FIG. 3 is a modification of FIG. 1 showing a single stage leach.

Referring first to FIG. 1, uranium-containing ore which also contains iron, arsenic, siliceous matter and nickel is first subjected to a grinding step 12, where water is added, to grind the ore to a suitable size, for example less than 16 to 42 mesh, and to produce a slurry of suitable solids content, for example 50 to 60% solids. A typical uranium-containing material of this kind may contain 1 to 3% uranium, 2 to 4% iron, 1 to 6% arsenic, 40 to 70% siliceous matter, 0.1 to 0.3% $P_2O_5$ and 1 to 4% nickel, with some carbonates also being present to provide about 1% carbon dioxide. From 3 to 11% aluminum, 0.5 to 4% magnesium and about 1% sulphur may also be present.

From the grinding step 12, the slurry is then fed to a first leach stage 14 to which air and sulphuric acid are also supplied, together with recycled solution from the second leach stage as will be described later. The first leach stage is conducted under atmospheric pressure at a temperature of about 30° to 60° C., a pH of about 0.9 to 1.3, and a pulp density of 10 to 30% solids. The pH of the first leach stage 14 is varied in accordance with the arsenic and ferric iron content, the higher the arsenic and ferric iron content, the lower the pH should be.

The air is bubbled through the slurry at a varied rate to control the oxidation potential of the system. It has been found that the oxidation potential in the first stage leach should be maintained in the range of from about 250 to about 350 mV (saturated calomel electrode v. platinum electrode) to provide a sufficient predominance of ferrous iron over ferric iron, preferably a ferrous to ferric ratio of at least 10:1, while at the same time producing dissolved uranium predominantly in the hexavalent stage rather than the quadrivalent stage.

Because of the carbonate content of the starting material, carbon dioxide gas is produced in a first leach stage 14, and such gas can simply be released to the atmosphere.

From the first leach stage 14, the slurry passes to a first settling tank 16 from which, after settling, the overflow solution containing dissolved uranium and other metal values passes at a pH of about 0.9 to 1.3 to a pretreatment step 18 and other steps which will be described in more detail later. The underflow slurry from the settling tank 16 passes to a second leach stage 20 to which sulphuric acid, steam and air or oxygen are supplied. The steam is regulated to maintain the temperature at 40° to 80° C., and the air or oxygen is regulated to maintain a total pressure of about 230 to 1,000 kPa, with an oxygen partial pressure of about 130 to 670 kPa. The pH of the second leach stage 20 is about 0.5 to 1.0 and the pulp density is about 30 to 50% solids.

In the second leach stage, most of the undissolved uranium from the first leach stage residue is leached, with further leaching of nickel and arsenic also occurring. It will be noted that carbon dioxide was released in the first leach stage 14, and therefore little or substantially no carbon dioxide is released in the second leach stage 20 and therefore does not interfere with this pressurized oxidizing leach stage.

From the second leach stage 20, the slurry passes to a second settling tank 22 from which, after settling, the overflow solution is recycled to the first leach stage 14. It has been found that, with such a two-stage leach, better settling is obtained, because higher acid levels are permissible in the second leach stage than in a single stage leach product and such higher acid levels prevent insoluble ferric arsenate formation which, if present, would be detrimental to the settling process.

The underflow slurry from the settling tank 22 passes to a countercurrent decantation step 24 to which water and appropriate flocculant are supplied to wash the undissolved residue from the second leach stage 20. Acid wash solution from the countercurrent decantation step 24 is recycled to the second settling tank 22 and thence to the atmospheric leach stage 14. The residue proceeds to a flotation step 26 to which suitable reagents are added to effect flotation of undissolved nickel arsenide in the residue. The nickel arsenide is then passed to a waste management system which will be described in more detail layer, and the remaining slurry is passed to a final neutralization step, which will also be described in more detail later. If desired, the flotation step 26 may be omitted, and the slurry passed directly to the final neutralization step.

As mentioned earlier, overflow solution from the first settling tank 16 proceeds to a pretreatment step 18. Briefly, the solution contains from about 12 to about 14 g/L sulphuric acid. Following the two-stage leach, the iron in solution is predominantly present as ferrous iron rather than ferric iron, since ferric iron recycled from the second leach stage is reduced in the first leach stage. It has been found that there may in fact be only a trace of ferric iron present in the leach solution from the first settling tank 16. Further, dissolved arsenic is partially present in its trivalent state.

The leach solution from the first settling tank 16 also contains colloidal silica which may cause problems in the subsequent solvent extraction step. Therefore, in the pretreatment step 18, a flocculant is added to reduce the colloidal silica content. A suitable flocculant is "POLYOX" which is a trademark of Union Carbide Corporation for a high molecular weight polyethylene oxide and a non-ionic water-soluble resin. The flocculant also promotes coagulation of other suspended solids which may detrimentally affect the solvent extractant step.

After the pretreatment step 18, the solution passes to a clarification step 28 to remove the flocculated matter which is passed to the countercurrent decantation washing step 24. At this stage, the leach solution will probably contain 3-6 g/L uranium, 2-6 g/L arsenic, 2-6 g/L nickel, 3-6 g/L iron, 0.1-0.3 g/L $P_2O_5$ and will probably also contain dissolved magnesium, aluminum and traces of many other heavy metals depending on the ore composition.

The solution then proceeds to a solvent extraction step 30 where the solution is contacted by a basic solvent extraction agent of the amine kind which has minimal affinity for arsenic. Such a solvent extraction agent may be the tertiary amine ALAMINE 336, a trade mark of Henkel Corporation, or ADOGEN 364, a trade mark of Ashland Chemicals. The extractant mixture may contain 3 to 8% by volume tertiary amines and 2 to 5% modifier such as isodecanol, with the remainder being kerosene diluent. The pH of the leach solution from the first settling tank 16 is about 0.9 to 1.3 which is a suitable value for the solvent extraction step 30, with no intermediate pH adjustment step therefore being necessary. The dissolved uranium is predominantly present in hexavalent form, and this is taken up by the solvent extraction agent.

The presence of iron predominantly as ferrous reduces the likelihood of crud and phase disengagement problems such as might be caused by arsenate precipitation resulting from an increase in solution pH as acid is co-extracted by the tertiary amine.

Referring now to FIG. 2, the leach solution from the clarification step 28 passes to an extraction stage 301 in the solvent extraction step 30, where uranium is loaded onto the solvent extraction agent. The loaded solvent extraction agent then passes to a scrubbing stage 302 where it is treated with water to remove any entrained leach liquor and co-extracted arsenic, the water then being passed to the loading stage 301 for combination with incoming solution from the clarification step 28. The loaded extraction agent then passes to a stripping stage 303 where the uranium is stripped at pH 3.5 to 5 by ammonium sulphate solution which is then passed to a yellow cake precipitation step 38.

Reverting now to FIG. 1, the uranium containing solution from the solvent extraction step 30 is passed to the yellow cake precipitation step 32 where ammonia is supplied to cause the dissolved uranium to be precipitated as yellow cake $(NH_4)_2U_2O_7$. The precipitated yellow cake is separated from the remaining solution in a separation step 34, and the remaining solution is returned to the solvent extraction step 30.

A bleed of ammonium sulphate solution from the yellow cake separation step 34, equivalent to the ammonium sulphate generated during the solvent extraction operation and yellow cake precipitation, proceeds to an ammonia recovery step 36 where the solution is heated with steam and treated with lime to cause ammonia to boil off and to produce a slurry containing calcium sulphate. The ammonia is returned to the solvent extraction step 30 and the yellow cake precipitation step 32, and the calcium sulphate slurry is passed to the final neutralization step which will be described later.

As indicated above, after uranium values have been extracted from the solution in the solvent extraction step 30, the barren liquor proceeds to an arsenic precipitation step 38 where the solution is heated by steam to a temperature of 60° to 110° C., preferably from 80° to 100° C., and treated with hydrogen sulphide gas to cause precipitation of arsenic sulphide. The resulting slurry is passed to a pressure filtration step 40 where the arsenic sulphide is filtered from the solution. The arsenic sulphide is passed to an arsenic pelletization step 42 where it is agglomerated with sulphur, such a process being carried out at a temperature above the melting point of sulphur to produce a product in the form of pellets.

The pelletized arsenic sulphide is then passed to a waste management system which will be described later, and water from the pelletization step 42 is returned to the arsenic precipitation step 38.

The solution from the pressure filtration step 40 proceeds to a nickel recovery step 44 where steam is used to raise the temperature to 100° to 140° C., preferably about 120° C., and hydrogen sulphide gas is supplied to precipitate nickel as nickel sulphide. This step may be preceded by a pH adjustment to raise the pH to about 2.5. This may be achieved by the addition of a suitable alkaline reagent such as magnesium oxide which does not produce a requirement for a liquid/solids separation step. The nickel sulphide is separated from the solution in a liquid/solids separation step 46 and removed as nickel sulphide product.

The remaining solution passes to a final neutralization step 48. As mentioned earlier, residue slurry from the nickel arsenide flotation step 26 and gypsum from the ammonia recovery step 36 are also passed to the neutralization step 48. The neutralization step 48 is also supplied with lime and air. Lime is supplied to raise the pH to about 8 to 11. Ferrous iron is oxidized to ferric iron and remaining metal values are precipitated as hydroxides, with arsenic values being precipitated as ferric arsenate or calcium arsenate.

Alternatively, nickel arsenide from the flotation step 26 may be agglomerated with sulphur in a similar manner as the arsenic sulphide in pelletization step 42. Also, if desired, the raffinate from the solvent extraction step 30 may proceed directly to the final neutralization step 48, with the arsenic precipitation step 38, the nickel recovery step 44 and associated steps being omitted, as indicated by the dotted line in FIG. 1.

The product from the final neutralization step 48 then proceeds to a waste management step 50, which as previously mentioned may also receive the nickel arsenide concentrate from the flotation step 26 and the pelletized arsenic from the pelletization step 42. Overflow solution from the waste management step 50 is passed to a radium removal step 52, where barium chloride is supplied to precipitate radium as $BaRaSO_4$.

The radium precipitate is separated from the remaining solution in a liquid/solids separation step 54 and returned to the waste management step 50. The remaining solution is stored in monitoring ponds 56 with some being used in the waste management step 50 and some being discharged to the environment.

The two-stage leach process described above may be carried out either as a batch process or as a continuous process.

Further, as indicated earlier, a single stage leach step may be used in place of the two-stage leach step described above.

FIG. 3 shows a flow sheet similar to that of FIG. 1 except that a single stage leach is provided. Slurry from the grinding step 12 is fed to a single stage leach 60 to which sulphuric acid and air or oxygen are also supplied. The leach is carried out at a temperature of 40° to 80° C., a pulp density of 30 to 50% solids, a pH of 0.5 to 1.2, with a total pressure of 230 to 1,000 kPa with an oxygen partial pressure of 130 to 670 kPa.

At the end of the leach, the leach slurry should have an oxidation potential of 400–500 mV to enable a ratio of ferric ions to ferrous ions of at least 3:1 to be obtained. A higher concentration of sulphuric acid is thus required, compared to the previously desired two stage leach, to prevent precipitation of ferric arsenate.

The leach slurry passes to a settling tank 62 from which, after settling, the overflow solution is passed to the pretreatment step 18. Preferably, the solution contains from about 16 to about 20 g/L $H_2SO_4$. The underflow slurry passes to the washing step 24. Water from the washing step 24 is recycled to the settling tank 22, and the washed residue passes to the neutralization step 48.

Examples of the invention will now be described.

TWO-STAGE LEACH

Blended ore crushed to less than 1 cm was wet ground to 100% -840 μm in a steel rod mill at 50–60% solids. The ore analysis is given in Table I.

TABLE I

| (% dry weight) | | | |
|---|---|---|---|
| $U_3O_8$ | 2.06 | Mg | 3.22 |
| As | 1.51 | $SiO_2$ | 50.0 |
| Ni | 2.40 | $P_2O_5$ | 0.12 |
| S | 0.80 | Ti | 0.49 |
| Fe | 3.49 | V | 0.083 |
| Ca | 0.35 | Mo | 0.0079 |
| Al | 8.32 | | |

The ground ore slurry, adjusted to 50% solids, was fed to the first cell of a continuous first stage leach unit which comprised four 10-liter capacity tanks connected in series. Each tank was equipped with baffles, an impeller for agitation and an air sparge tube. Simultaneously, recycle solution (second stage pressure leach thickener overflow) was adjusted to approximately 25 g/L $H_2SO_4$ with 96% sulphuric acid. The flow rates of the 50% solids ore slurry and the recycle solution were in the ratio of 1:3 so that the initial pulp density in the leach was 16% solids. The recycle solution was preheated to 40° C. to give a 35°–40° C. temperature profile in the first stage leach circuit. The total flow into the system was such that the overall retention time of solution and solids in the first stage leach was 57 minutes. Samples of the tank contents were taken after the system had reached steady operation (usually at 3 and 6 hours of continuous running). The solutions were analyzed to determine the extraction efficiencies, acid consumption and ferric iron reduction. EMF and pH measurements were also made. Results are given in Table II.

TABLE II

| | Filtrate | | | | | | | | | | Extractions (%) | | | | | | Acid Consumption |
|---|---|---|---|---|---|---|---|---|---|---|---|---|---|---|---|---|---|
| Item | EMF (mv) | pH | $U_3O_8$ ← | Ni ← | As ← | Al (g/L) | Mg → | $H_2SO_4$ → | $Fe^{+++}$ → | $Fe^{++}$ → | $U_3O_8$ → | Ni → | As → | Al → | Mg → | Fe → | (kg/tonne) |
| Recycle Solution Feed | 385 | 0.80 | 5.15 | 2.58 | 1.90 | 2.32 | 1.88 | 24.6 | 1.3 | 2.5 | | | | | | | |
| Tank #1 | 330 | 1.05 | 5.51 | | | | | 13.6 | | 3.9 | 34 | | | | | | |
| Tank #2 | 300 | 1.05 | 5.60 | | | | | 13.1 | | 4.3 | 36 | | | | | | |
| Tank #3 | 300 | 1.05 | 5.69 | | | | | 13.6 | | 4.4 | 38 | | | | | | |
| Tank #4 | 305 | 1.02 | 5.71 | 3.23 | 2.49 | 2.00 | 1.80 | 14.0 | <0.1 | 4.1 | 39 | 24 | 33 | 0.8 | 4.6 | 14.3 | 31 |

The dissolved iron was predominantly in the ferrous form. The final solution EMF (tank #4) was 305 mV. The solution pH was 1.0 and the acid content was 14.4 g/L, at the optimum level for the subsequent solvent extraction step.

The product slurry from the first stage leach was treated with Percol 351 flocculant (100 g/tonne solids) to facilitate the separation of solution and leach residue. The product solution was decanted off after several hours. Solution treatment is described later. The thickened slurry at 35% solids was charged to an autoclave of 60 liter operating capacity equipped with an agitator, baffles and a sparge tube for introduction of air or oxygen into the slurry. The agitated slurry was heated to 70° C. under agitation. At that temperature, an air pressure of 900 kPa was applied, corresponding to an oxygen partial pressure of 180 kPa. Continuous sparging of air into the slurry and venting of gases from the autoclave was conducted to ensure the maintenance of 180 kPa oxygen partial pressure. Sufficient sulphuric acid was added to the charge to ensure a high uniform extraction and prevent the precipitation of insoluble arsenates. Samples were withdrawn from the autoclave to monitor the progress of the leach. After 90 minutes retention time, the solids contained only 0.018% $U_3O_8$ corresponding to an overall (first stage plus second stage) extraction of 99.2%. The solution contained 43 g/L $H_2SO_4$, and 3.7 g/L $Fe^{+++}$, indicating sufficiently high acid to prevent ferric arsenate precipitation and a ferric iron concentration sufficient for high uranium extraction.

SOLVENT EXTRACTION

The product solution from the first stage leach test described above was treated by solvent extraction using the basic solvent extraction agent, Alamine 336, which is a tertiary amine. Prior to the solvent extraction step, the solution was treated with Polyox to precipitate colloidal silica. After clarification, the solution contained 5.33 g/L $U_3O_8$, 2.37 g/L As and 14.5 g/L $H_2SO_4$. The solvent extraction circuit was a continuous system capable of treating 3–6 liters per hour of aqueous solution, and comprised four extraction stages, 3 scrubbing stages, and 4 stripping stages. The Alamine 336 concentration in the organic phase was 5% by volume. Volume ratios, $V_{org}/V_{aq}$, in the various stages were as follows: Extraction, 1:1; scrubbing (acidified water), 10:1; stripping (ammonium sulphate solution plus ammonia), 3:1. Yellow cake was then precipitated from the pregnant strip solution. The results are shown in Table III below.

The loaded organic contained only 0.034–0.038 g/L arsenic and this was further reduced to 0.002 g/L in the scrubbing circuit. The resulting yellow cake product contained only 0.014–0.016% arsenic.

In another solvent extraction test using an exceptionally high arsenic-containing solution, 5.08 g/L $U_3O_8$ and 4.84 g/O As, derived from a high arsenic ore, a yellow cake product containing only 0.028% arsenic was produced, further demonstrating the excellent uranium-arsenic separations achievable by a process in accordance with the present invention.

BARREN RAFFINATE NEUTRALIZATION

As mentioned earlier, the barren raffinate remaining after the uranium extraction step may be neutralized directly with lime to precipitate the remaining metal values as hydroxides and to precipitate the remaining arsenic values as arsenates. A number of raffinates were blended from other tests, and neutralization was conducted on a continuous basis in the same apparatus used for the first stage leaching described earlier. Raffinate and milk of lime slurry were added to the first cell. Additional lime was added as required to the second cell to ensure a final pH of at least 8 and preferably 10–11. Air was added to all four cells to oxidize ferrous iron to ferric iron. The neutralized slurry discharge was thickened and filtered to yield a barren waste solution which, after radium and further arsenic removal, was suitable for discharge to the environment, and a hydroxide/arsenate/gypsum cake, suitable for disposal to the waste management system. Solution concentrations before and after the lime treatment are shown in Table IV below:

TABLE IV

| Component | Raffinate Analysis (mg/L) | Neutralized Raffinate Analysis (mg/L) |
|---|---|---|
| Al | 1080 | 1.7 |
| As | 1950 | 2.4 |
| Ca |  | 605 |
| Cd |  | <0.1 |
| Cr | 4.6 | 0.1 |
| Co | 47 | 0.1 |
| Cu | 48 | <0.1 |
| Fe | 2340 | 0.1 |
| Pb | 28 | <0.1 |
| K |  | 42 |
| Mg | 975 | <0.1 |
| Mn | 34 | <0.1 |
| Mo | 3.2 | 1.1 |
| Na |  | 57 |
| Ni | 2840 | <0.1 |
| P | 49 | 0.2 |
| Se | 15 | 0.5 |
| Si | 257 | 0.6 |
| S |  | 570 |
| Th | 5.7 | 0.2 |
| Ti | 3.6 | <0.1 |
| U | 2.2 | 1.5 |
| V | 31 | 0.1 |
| Zn | 63 | <0.1 |

TABLE III

| SX Feed Solutions (g/L) | | | Raffinates (g/L) | | | Loaded Organic (g/L) | | | Scrubbed Organic (g/L) | | | | Stripped Organics (g/L) | | Pregnant Strip (g/L) | | Yellow Cakes (g/L) | |
|---|---|---|---|---|---|---|---|---|---|---|---|---|---|---|---|---|---|---|
| $U_3O_8$ | As | $H_2SO_4$ | $U_3O_8$ | $H_2SO_4$ | pH | $U_3O_8$ | As | O/A | $U_3O_8$ | As | pH Max. | | $U_3O_8$ | As | $U_3O_8$ | As | $U_3O_8$ | As |
| 5.33 | 2.37 | 14.5 | 0.0062 | 7.1 | 1.19 | 4.42 | .034 | 10.5 | 4.52 | 0.002 | 4.62 | | 0.0072 | 0.001 | 18.2 | 0.002 | 84.7 | 0.016 |
|  |  |  | 0.0063 | 7.3 | 1.2 | 4.54 | .038 | 10.8 | 4.66 | <0.002 | 4.70 | | | <0.001 | 18.2 | 0.001 | 86.4 | 0.014 |

SINGLE STAGE LEACH

The ore used in the two stage leach test was also used in these tests, and was crushed to provide a ground ore slurry in a similar manner as described previously.

Leach tests were conducted in a 100 liter autoclave equipped with an agitator, baffles, an internal coil for heating and cooling, a dip pipe for air or oxygen introduction into the slurry, and sampling lines to monitor the progress of the leaching reactions. Sixty liters of the ground ore slurry containing 50% solids was introduced into the autoclave. Agitation was commenced and steam passed through the heating coils to heat the slurry to 60° C. Sulphuric acid (75 kg/tonne of ore) was injected into the autoclave, raising the temperature to 70° C. and initiating the leaching reactions. An additional 75 kg/tonne of ore was added 15 minutes later to ensure sufficient acid for uranium extraction and the prevention of ferric arsenate and/or uranium arsenate precipitation. The autoclave was pressurized to 620 kPa with oxygen and a continuous sparge of 5.0 liters/min (NTP) of oxygen was maintained for the duration of the test. Samples were periodically withdrawn from the autoclave. Results are given in Table V below.

TABLE V

| | Solution Analysis | | | | | | | | |
|---|---|---|---|---|---|---|---|---|---|
| Time (h) | EMF mV ← | pH ← | $H_2SO_4$ ← | $Fe^{++}$ ← | $Fe^{+++}$ ← | $U_3O_8$ (g/L) → | Ni → | As → | Al → | Mg → |
| 0 | | | | | | | | | | |
| 0.25 | 270 | 0.8 | 24 | 7.4 | <0.1 | | | | | |
| 0.5 | 270 | 0.3 | 70 | 10.6 | <0.1 | | | | | |
| 1.0 | 310 | 0.35 | 62 | 12.6 | 1.0 | | | | | |

TABLE V-continued

| Time (h) | U₃O₈ | | | | | | | | | |
|---|---|---|---|---|---|---|---|---|---|---|
| 1.5 | 365 | 0.5 | 56 | 10.3 | 4.4 | | | | | |
| 2.0 | 380 | 0.5 | 51 | 7.5 | 7.8 | | | | | |
| 3.0 | 410 | 0.7 | 46 | 4.2 | 12.1 | 25.0 | 13.8 | 11.3 | 6.85 | 6.35 |

| Time (h) | Residue Analysis | | | Extractions (%) | | | | | | Acid Consumed (kg/t) |
|---|---|---|---|---|---|---|---|---|---|---|
| | U₃O₈ ← | Ni (%) | As → | U₃O₈ | Ni | As | Fe | Al | Mg | |
| 0 | 2.06 | 2.40 | 1.51 | | | | | | | |
| 0.25 | 1.08 | | | 52.7 | | | | | | |
| 0.5 | 0.72 | | | 68.5 | | | | | | |
| 1.0 | 0.36 | | | 84.2 | | | | | | |
| 1.5 | 0.12 | | | 94.8 | | | | | | |
| 2.0 | 0.037 | | | 98.4 | | | | | | 103 |
| 3.0 | 0.012 | 1.21 | 0.47 | 99.5 | 57.1 | 73.5 | 50 | 8.8 | 22.3 | 108 |

The uranium extraction was 99.5% after 3 hours retention time. The final acid concentration was 46 g/L, which is slightly above the minimum requirement of 35–40 g/L (established in batch test work) to ensure high uranium extraction and good liquid/solid separation characteristics.

The leached slurry was washed and allowed to settle. Overflow solution was withdrawn and was suitable for pretreatment and solvent extraction. The overflow solution contained 5.0 g/L U₃O₈, 2.3 g/L As and 20.0 g/L H₂SO₄.

Other embodiments and examples within the scope of the invention will be apparent to a person skilled in the art, the scope of the invention being defined in the appended claims.

We claim:

1. A process for the recovery of uranium values from uranium-containing material which also contains iron, arsenic and siliceous matter, comprising leaching the uranium-containing material in aqueous sulphuric acid solution in first and second stages, carrying out the first stage at atmospheric pressure to produce a residue and a leach solution containing uranium values and ferrous and ferric ions with a ratio of ferrous to ferric ions being at least about 10 to 1, passing the residue from the first stage to the second stage, carrying out the second stage under a total pressure of at least about 230 kPa to produce a residue and a leach solution containing uranium values and dissolved iron predominantly in ferric form, recycling the leach solution from the second stage to the first stage, and recovering uranium values from the first stage leach solution by solvent extraction with a solvent extraction agent which has little affinity for arsenic.

2. A process according to claim 1 wherein the first leach stage is carried out at a temperature of about 30 to about 60° C., a pH of about 0.9 to about 1.3, and a pulp density of about 10 to about 30% solids, and the second leach stage is carried out at a temperature of about 40° to about 80° C., a pH of about 0.5 to about 1.0, a pulp density of about 30 to about 50% solids, a total pressure of about 230 to about 1000 kPa, with an oxygen partial pressure of about 130 to about 670 kPa.

3. A process according to claim 1 wherein the solvent extraction agent is a basic solvent extraction agent.

4. A process according to claim 3 wherein the solvent extraction agent comprises a tertiary amine.

5. A process according to claim 1 wherein, after recovery of uranium values from the leach solution, the remaining solution is treated with hydrogen sulphide gas at a temperature of from about 60° to about 110° C. to precipitate dissolved arsenic as arsenic sulphide, and the precipitated arsenic sulphide is removed from the solution.

6. A process according to claim 5 wherein the uranium-containing material also contains nickel and, after the arsenic removal step, the remaining solution is treated with hydrogen sulphide gas to a temperature of from about 100° to about 140° C. to precipitate dissolved nickel as nickel sulphide, and the precipitated nickel sulphide is removed from the solution.

7. A process according to claim 6 wherein, after the nickel removal step, the remaining solution is treated with lime to raise the pH to a value in the range of from about 8 to about 10 and with air to oxidize ferrous iron to ferric iron, to precipitate the remaining nickel values as hydroxides, and to precipitate remaining arsenic values as arsenate.

8. A process according to claim 1 wherein, after the solvent extraction step, the remaining solution is directly treated with lime to raise the pH to a value in the range of from about 8 to about 10, and with air to oxidize ferrous iron to ferric iron, to precipitate remaining metal values as hydroxides, and to precipitate remaining arsenic values as arsenates.

* * * * *